(12) United States Patent
Lagno Sanchez et al.

(10) Patent No.: US 9,279,168 B2
(45) Date of Patent: Mar. 8, 2016

(54) PROCESS FOR RECOVERY OF TECHNICAL GRADE MOLYBDENUM FROM DILUTED LEACHING ACID SOLUTIONS (PLS), WITH HIGHLY CONCENTRATED ARSENIC, FROM METALLURGICAL RESIDUES

(75) Inventors: Felipe Andrés Lagno Sanchez, Santiago (CL); Ricardo Fernando Sepúl Veda Letelier, Santiago (CL); Marcelo Gustavo Acuña Goycolea, Santiago (CL)

(73) Assignee: EcoMetales Ltd. (CL)

( * ) Notice: Subject to any disclaimer, the term of this patent is extended or adjusted under 35 U.S.C. 154(b) by 0 days.

(21) Appl. No.: 14/240,567

(22) PCT Filed: Aug. 24, 2012

(86) PCT No.: PCT/IB2012/054308
§ 371 (c)(1),
(2), (4) Date: May 19, 2014

(87) PCT Pub. No.: WO2013/030741
PCT Pub. Date: Mar. 7, 2013

(65) Prior Publication Data
US 2014/0301918 A1  Oct. 9, 2014

(30) Foreign Application Priority Data

Aug. 26, 2011 (CL) .................................. 2095-2011

(51) Int. Cl.
| | |
|---|---|
| C22B 34/34 | (2006.01) |
| C01C 1/02 | (2006.01) |
| C01G 39/02 | (2006.01) |
| C01G 39/00 | (2006.01) |
| C22B 3/42 | (2006.01) |

(52) U.S. Cl.
CPC ................. *C22B 34/34* (2013.01); *C01C 1/026* (2013.01); *C01G 39/003* (2013.01); *C01G 39/02* (2013.01); *C22B 3/42* (2013.01); *Y02P 10/234* (2015.11); *Y02W 30/54* (2015.05)

(58) Field of Classification Search
None
See application file for complete search history.

(56) References Cited

U.S. PATENT DOCUMENTS

| | | | |
|---|---|---|---|
| 3,681,016 | A | 8/1972 | Litz |
| 4,273,745 | A | 6/1981 | Laferty et al. |
| 4,596,701 | A | 6/1986 | Cheresnowsky et al. |
| 4,891,067 | A | 1/1990 | Rappas et al. |
| 4,891,193 | A | 1/1990 | Beutier et al. |

FOREIGN PATENT DOCUMENTS

| | | |
|---|---|---|
| CL | 2005-03137 | 12/2006 |
| ES | 2 004 072 | 12/1988 |

OTHER PUBLICATIONS

International Search Report for International Application No. PCT/IB2012/054308 mailed Jan. 29, 2013 (4 pages).

*Primary Examiner* — Steven Bos
(74) *Attorney, Agent, or Firm* — Merchant & Gould P.C.

(57) ABSTRACT

A method for recovering technical-grade molybdenum from diluted acid leaching solutions (PLS) that have a high arsenic concentration is disclosed. The method includes: (a) contacting a pre-filtered PLS with an anionic ion-exchange resin; (b) washing the loaded resin with water; (c) extracting molybdenum from the resin with an alkaline ammonium regenerant solution to form ammonium molybdenum in solution; (d) washing the unloaded resin with water; (e) adding iron and/or magnesium salts to the recovered ammonia solution to obtain a precipitate which is transferred to the arsenic abatement step and a solution containing ammonium molybdate; (f) adding sulphuric acid to the arsenic-free ammonia solution to precipitate ammonium molybdate; (g) separating the precipitate by filtering the molybdate and re-circulating the solution obtained with the initial PLS; (h) calcining the separated precipitate to obtain ammonia and molybdenum trioxide; and (i) recovering the released ammonia for subsequent use as a recirculated regenerant solution.

7 Claims, 3 Drawing Sheets

Figure 1:
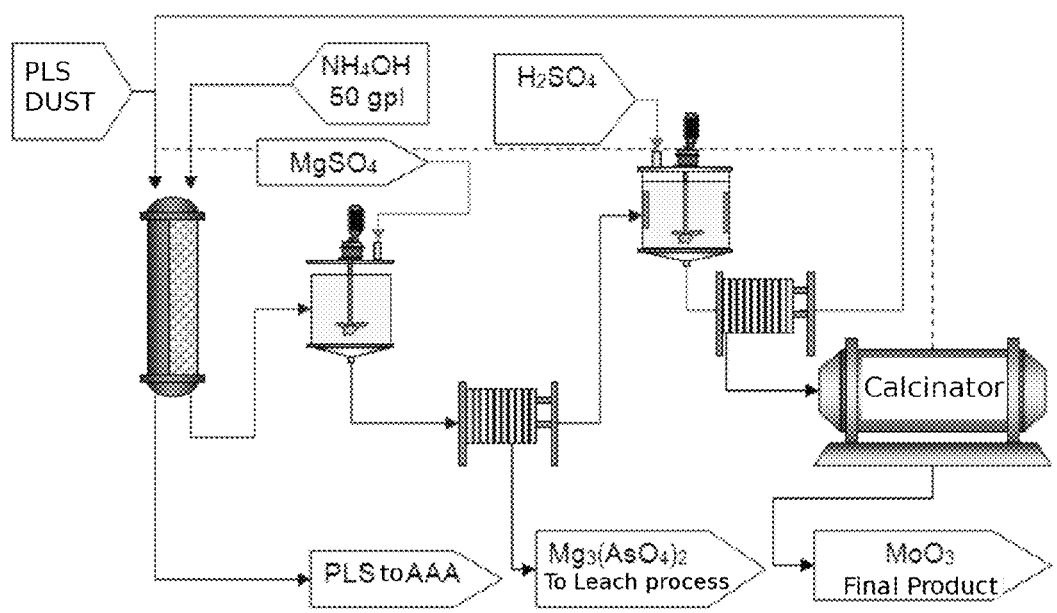

PROCESS FOR RECOVERY OF TECHNICAL GRADE MOLYBDENUM FROM DILUTED LEACHING ACID SOLUTIONS (PLS), WITH HIGHLY CONCENTRATED ARSENIC, FROM METALLURGICAL RESIDUES

This application is a National Stage Application of PCT/IB2012/054308, filed 24 Aug. 2012, which claims benefit of Serial No. 2095-2011, filed 26 Aug. 2011 in Chile and which applications are incorporated herein by reference. To the extent appropriate, a claim of priority is made to each of the above disclosed applications.

The present invention discloses a process for obtaining technical grade molybdenum trioxide from diluted leaching acid solutions (PLS) containing highly concentrated arsenic, antimony or bismuth. Such a solution is obtained by leaching of metallurgic residues with a high concentration of these impurities, such as casting powders.

More specifically, the present invention discloses a process for recovering molybdenum through ionic exchange, through which molybdenum is separated from other metals also present in the solution, through the use of ionic exchange resins and controlled precipitation of As, Sb, and Bi, with magnesium or iron salts, followed by an ammonium molybdate precipitation, which is later calcined to obtain technical grade molybdenum trioxide.

BACKGROUND OF THE INVENTION

A mining process or method is the summation of methods through which, starting from a deposit, metals and/or metallic compounds of commercial purity and quality are obtained, in a profitable manner and with an acceptable environmental impact.

In the known leaching process, one or many mineral values contained in an ore or a concentrate are dissolved, generally using an aqueous solution of a leaching agent. The term can also be extended to include dissolving secondary materials, such as scrap metals, residues, and waste.

Leaching produces an aqueous solution rich in extracted ions of the valued metal (PLS, pregnant leaching solution) from which it is possible to separate this metal and recover it with a high level of purity. Also, a solid residue or gravel is produced, that, ideally, has a sufficiently low level of valued leached minerals, as to discard it in tailings or dump.

If the solid leaching residue is impregnated with salts or precipitates that eventually can release toxic agents once exposed to the environment, before discard, the residue must be properly treated in order to achieve elimination or stabilization of the potentially contaminant compounds. In some cases, leaching can have a different objective than the one previously described. For example, when a concentrate is leached for selectively extracting certain impurities, and leaching processes increase the quality of concentrate (for example during removal of copper from molybdenite concentrates).

In purification and enrichment processes of solutions, leaching processes are not necessarily selective and consequently produce leaching solutions containing, besides the metal of interest, a range of impurities. This, added to the fact that concentration of the metal of interest may not be too high, makes direct recovery of the metal of interest from the leaching solution impossible. Accordingly, these solutions must be pre-treated through purification and enrichment steps.

Purification eliminates impurities, effectively isolating valuable elements. Enrichment of solutions is also particularly beneficial for reducing the volumes of solution to be treated in subsequent steps of metal recovery. This decreases investment costs and increases efficiency in recovery.

In the present invention, a process for recovery of molybdenum as molybdenum trioxide, from diluted acid leaching solutions of metallurgic residues, having a high concentration of arsenic, antimony, or bismuth, is disclosed.

The object of the present invention is to recover molybdenum, through ion exchange, contained in diluted leaching solutions containing molybdenum, but having a high concentration of arsenic, among other impurities, in such a manner that a molybdenum product is obtained efficiently and profitably.

Prior art includes documents disclosing molybdenum recovery through ion exchange. Such is the case of U.S. Pat. No. 4,891,067, disclosing a process for selective separation of molybdenum present in an acid solution at pH 2 and containing molybdenum and at least one of the elements in the group consisting of uranium, iron, arsenic, phosphorous, silicon, and vanadium. Such a process comprises contacting the acid solution with a stationary phase consisting of a resin with an active oxime group, and eluting the stationary phase with an alkaline solution to recover molybdenum. U.S. Pat. No. 4,596,701 discloses a procedure for purifying molybdenum trioxide, specifically disclosing a method for preparing ammonium molybdate comprising contacting a concentrate with an aqueous solution of sulfuric acid, ammonium, ammonium sulfate and persulfate, and solubilizing at least 2% of the molybdenum present in the concentrate.

A Chilean patent application CL N° 3137-2005 discloses a process for molybdenum and copper extraction, which are contained in solidified slags from fusion processes in copper concentrates. This document does not interfere with the present patent application since the slag does not contain arsenic, therefore treating a technical problem different to the one addressed in the present patent application.

None of the previously mentioned processes interfere with the present application since such documents of the prior art show processes with different operative variables, and therefore, do not provide the benefits obtained with the present invention, which include efficiently and profitably recovering technical grade $MoO_3$ (molybdenum trioxide) from leaching solutions with high arsenic content. Through the present invention, a technical grade molybdenum trioxide is obtained, which means having a molybdenum content over 58%, and a content of non-regulated metals, such as As, Sb, and Bi, in amounts lower than 0.1%.

DESCRIPTION OF THE INVENTION

The process of the present invention relates to recovery of molybdenum through ion exchange, followed by an increase in the concentration of molybdenum in the regenerant, precipitating impurities, precipitating molybdenum, passing through drying, and calcination, to obtain the final product of technical grade molybdenum trioxide, as shown in FIG. 1.

More specifically, the present invention discloses a process to recover over 70% or more, specifically around 90% of molybdenum present in PLS as technical grade $MoO_3$. Specifically, the invention includes selective recovery of molybdenum, in the form of $MoO_3$, from PLS solution generated from leaching of casting powders.

The present invention includes a process for recovering molybdenum through ion exchange. The process has been validated in a pilot plant and the fundamental aspects of the process, validation steps, and methodology of industrial scaling, as disclosed in the present invention, show a novel and inventive process.

The ion exchange process includes two steps which repeat in ion exchange cycles: charge and regeneration of the resin, each of which is followed by water washing steps. The charge process of the resin includes capturing molybdenum ion in molybdate form from the acid leaching solution, while the regeneration process of the resin includes re-extraction or discharge of the molybdate ion using an alkaline regenerating solution. The equations corresponding to the process are shown below:

Resin charge step:

$$H_2MoO_4 + 2R\text{—}OH \rightarrow R_2\text{-}MoO_4 + 2H_2O$$

Resin regeneration step:

$$R_2\text{—}MoO_4 + 2NH_4OH \rightarrow 2R\text{—}OH + (NH_4)_2MoO_4$$

R represents the ion exchange resin. The resin used in this process is of anionic weak base or anionic weak/string base type, presenting functional groups selected from secondary, tertiary, tertiary/quaternary amines, and polyamines.

Molybdenum extraction with ion exchange resins is performed by contacting a PLS solution containing Mo with an anionic resin. This contact can be discontinuous, by adding the resin to the solution and agitating, or continuous, by using columns.

Molybdenum extraction using ion exchange is highly selective for Mo. Solutions obtained through leaching of metallurgic residues or casting powders that contain elements and impurities that are co-extracted during the process of ion exchange. In particular, As, Sb, and Bi are partially extracted during the ion exchange and can be found in the charged regenerating solution. Therefore, the charged solution must undergo impurity removal (FIG. 2).

Afterwards, charged Mo must be discharged from the resin by contacting the charged resin with an alkaline solution of ammonium hydroxide, such that a Mo charged solution is obtained, contaminated with As, Sb, or Bi which are partially co-extracted with Mo.

Figure 2:
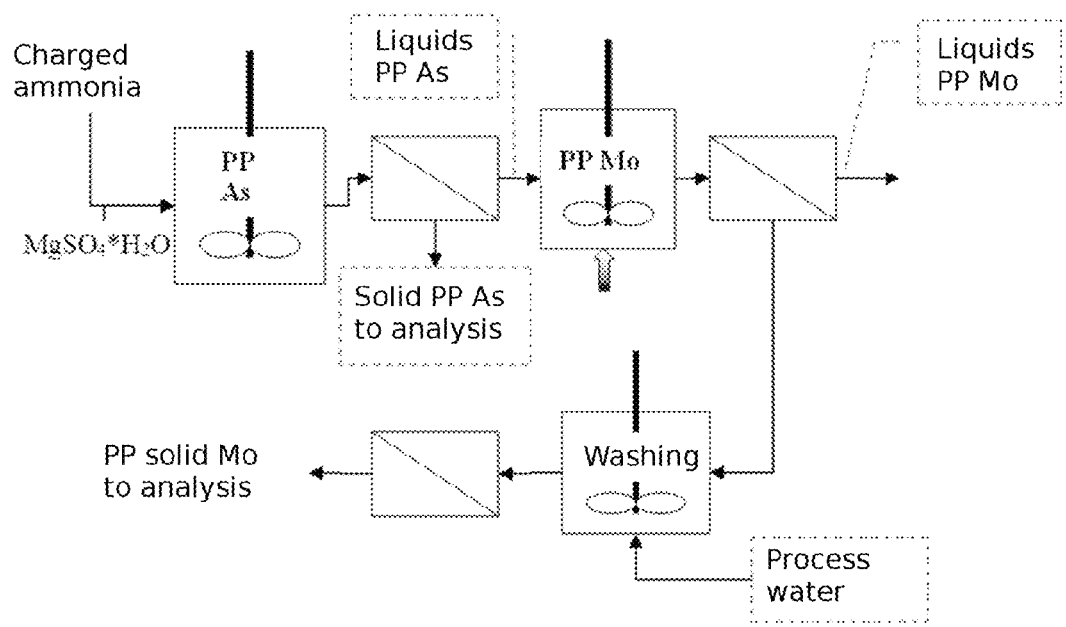

Removal of these impurities can be performed by precipitating with a magnesium or iron salt, yielding a solid product that must be treated for further disposition and also yielding a regenerating solution that is charged with Mo and virtually free of impurities (FIG. 2). Chemical reactions using magnesium sulfate for arsenic, antimony, and bismuth precipitations are:

$$3MgSO_4 + H_3AsO_4 \rightarrow Mg_3(AsO_4)_2(s) + H_2SO_4$$

$$MgSO_4 + 2HSbO_2 \rightarrow Mg(SbO_2)_2(s) + H_2SO_4$$

$$MgSO_4 + 2HBiO_2 \rightarrow Mg(BiO_2)_2(s) + H_2SO_4$$

After removal of As, Sb, and Bi, a charged regenerating solution is obtained, free of impurities, which is then sent to the Mo precipitation step (FIG. 2) which includes adding sulfuric acid. Mo precipitates as ammonium molybdate with an efficiency higher than 70%, according to the following reaction:

$$8(NH_4)_3MoO_4 + 6H_2SO_4 \rightarrow (NH_4)_4Mo_8O_{26} + 6(NH_4)_2SO_4 + 6H_2O,$$

Figure 3:
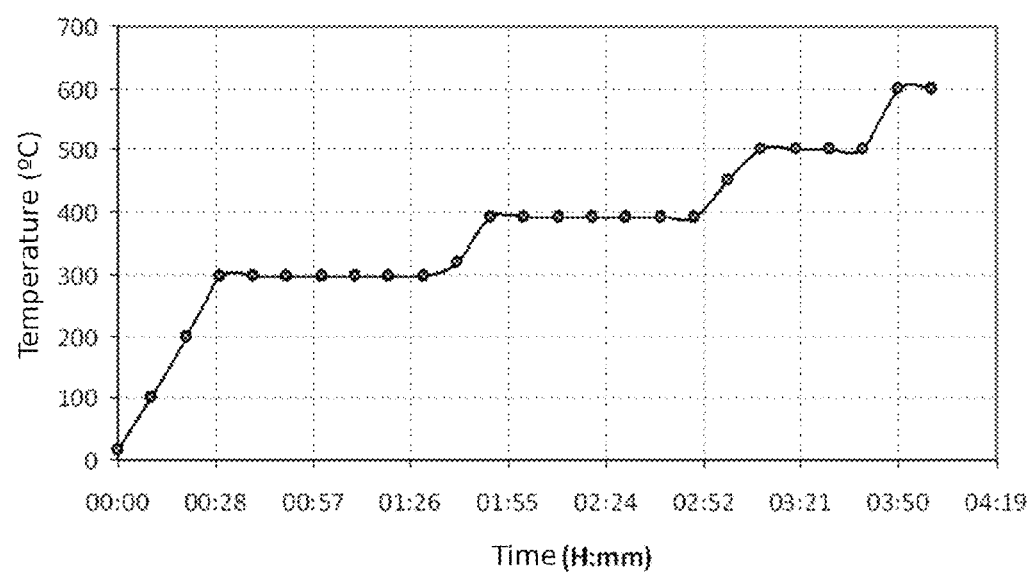

The last step to obtain molybdenum trioxide is the calcination step, wherein the ammonium molybdate precipitate is subjected to controlled heating from 20 to 700° C. The temperature profile used (FIG. 3) in the calcination step of the present invention includes:

1. Heating from 20 to 260° C. and holding for approximately 20 minutes to 2 hours, for removing hydration water.

2. Heating from 260 to 370° C. and holding for approximately 20 minutes to 2 hours, for removing water and ammonia.

3. Heating from 370 to 500° C. and holding for approximately 20 minutes to 2 hours, for removing arsenic as arsenic oxide.

4. Heating from 500 to 700° C. and holding for approximately 20 minutes to 2 hours, for decomposition and desorption of sulfur and arsenic.

In summary, using the present invention allows molybdenum trioxide to be produced with impurities, such as As, Sb, and Bi, in amounts lower than 0.1%. The present invention in more detail includes the following correlative steps:

1. Contacting a pre-filtered acid aqueous solution (PLS) having a pH lower than 1.6 with an ion exchange resin of anionic type, such as a resin described in Table 1.

2. Washing the resin with water post-charge to avoid potential precipitation of solid elements that are dissolved in PLS due to its acidity (such as iron) which could precipitate when in contact with the regenerant due to the basic pH of the ammonium hydroxide solution.

3. Extracting molybdenum from the ion exchange resin using an alkaline solution of ammonium hydroxide in a concentration ranging from around 5 g/L to 150 g/L, reaching a pH of around 8 to 12, more preferably between 8.5 and 9.5, in the form of an ammonium molybdate in solution.

4. Washing the resin with water post-discharge, similar to step 2.

5. Adding a magnesium or iron salt, such as for example magnesium sulfate, magnesium chloride, or ferric sulfate, to the solution obtained in step 3 to obtain a pulp with a precipitate comprising arsenic and other impurities, which is separated in two lines: an ammonia solution and a solid. The ammonia solution contains Mo, and passes to the molybdenum precipitation step. The solid (e.g., $Mg_3(AsO_4)_2$ and/or $FeAsO_4$) is carried to an abatement step and external disposition.

6. Adding $H_2SO_4$ to the ammonia solution obtained in step 5 to precipitate the molybdenum in the form of ammonium molybdate (($NH_4$)$_4Mo_8O_{26}$) in an acid medium with a pH of 1.5 to 4, more preferably pH 3.3, and a temperature between 50° C. to 90° C., more preferably 70° C.

7. Separating the precipitate of step 6 by filtrating ammonium molybdate. The solution obtained is recirculated to mix with the initial solution of PLS.

8. Calcining the filtered product of step 7 in a ramp or steps of temperature between 20 and 700° C. to yield technical grade molybdenum trioxide ($MoO_3$). This step allows removal of sulfur, arsenic, and ammonium traces, therefore the product complies with requirements for the market of technical grade molybdenum trioxide.

9. Additionally recovering ammonia generated in calcination step 8 in a condenser and/or gas scrubber for further return to the process as a regenerant.

Weak (WBA) and mixed weak/strong (WBA/SBA) anionic ion exchange resins were tested in the process of the present invention. As an example and without limiting the invention, the resins indicated in Table 1 were tested. After a large number of batch and in column tests, the results described in Table 2 were obtained.

TABLE 1

Resins used in batch and column tests.

| Resin | Type | Base | Appearance | Size (μm) | Structure | Functional Group | Capacity (eq./L) |
|---|---|---|---|---|---|---|---|
| A 170/4675 | WBA | Free | Spherical (pearls) | 875 +/− 125 | Macroporous PES/DVB | Complex Amine | 1.3 (base Free) |
| A 100 Mo | SBA/WBA | Chloride | Spherical (pearls) | 800 to 1300 | Macroporous PES/DVB | Tertiary amine | 3.8 (base Cl—) |
| MP 64 | SBA/WBA | Free | Spherical (pearls) | 590 +/− 50 | Macroporous PES/DVB | Tertiary/quaternary amine | 1.3 (base Free) |
| MP 62 | WBA | Free | Spherical (pearls) | 470 +/− 60 | Macroporous PES/DVB | Tertiary amine | 1.7 (base Free) |
| A 365 | WBA | Free | Spherical (pearls) | >400 | Acrylate gel/DBV | Polyamine | 3.4 (base Free) |

TABLE 2

Results obtained for column tests.

| Resin | Mo Extraction efficiency from PLS | Mo Re-extraction efficiency from resin |
|---|---|---|
| MP64 | 90% | 52.3% |
| MP62 | 86% | 65% |
| A365 | 61% | 47% |
| A170/4675 | 62% | 72.1% |
| A100Mo | 81% | 56.1% |

As can be seen in Table 2, all resins present an acceptable percentage of affinity for Mo, and outstanding resins include MP64, MP62 and A100Mo. Nevertheless, in Mo re-extraction capacity from the resin, A170/4675 and MP62 resins stand out.

The variables that are considered relevant for obtaining a product with fewer impurities are reflected in Table 3.

TABLE 3

Analyzed operating variables for precipitation of impurities and Mo.

| | Level | |
|---|---|---|
| Variable | Low | High |
| Mo concentration in charged regenerating solution | ≈5,000 mg/L | ≈10,000 mg/L |
| Feed solution pH for precipitation of As | ≈8.5 | ≈9.5 |
| Feed solution temperature for precipitation of As | room temperature | 60° C. |
| Residence time for precipitation of As | 30 min | 120 min |
| As concentration in feed for precipitation of As | 2,500 mg/L | ≈8,000 mg/L |
| Sb concentration in feed for precipitation of Sb | 39 mg/L | ≈150 mg/L |
| Concentration of Bi in feed for precipitation of Bi | 29.2 mg/L | ≈64.9 mg/L |
| Feed solution pH for precipitation of Mo | ≈7.3 | ≈8.5 |
| Residual solution pH for precipitation of Mo (at 70° C.) | ≈2.8 | ≈3.3 |
| Residence time for precipitation of Mo | 30 min | 120 min |

EXAMPLE

330 L of PLS solution were contacted with 6 L of Lanxess® MP-62 resin (for exemplification, and without limiting the invention). The resin was disposed in a static column which allowed passing PLS solution at a 4.5 L/h flow rate. After this period, a "refined" or Mo-free solution was obtained, as shown in Table 4.

Afterward, 12 L water were passed at a 4.5 L/h flow rate for washing the resin. After washing, the resin was regenerated, extracting the captured Mo, passing an alkaline ammonium hydroxide solution (50 g/L $NH_4OH$) through the column. This procedure was performed for 47 cycles of charge/discharge, using 330 L of fresh PLS solution in each cycle. The regenerating solution was not modified since its concentration increases in each cycle; maintaining the pH close to 9.

TABLE 4

PLS solution concentration before and after Mo extraction

| | [Mo] (mg/L) | [Sb] (mg/L) | [Bi] (mg/L) | [As] (mg/L) |
|---|---|---|---|---|
| PLS Solution | 315 | 93 | 78 | 13,840 |
| Refine solution | 26 | 51 | 59 | 13,692 |
| Charged regenerating solution | 11,740 | 2,230 | 951 | 8,330 |

The charged regenerating solution was fed to a 5 L reactor for precipitating impurities, contacting 215.8 g of magnesium sulfate (5% above stoichiometric value). The pulp was left reacting for 120 min. The solid was filtered and washed for disposition. The results obtained show a high efficiency in precipitation of impurities, yielding a solution with only 41 mg/L of As and concentrations of Sb and Bi lower than 10 mg/L. No co-precipitation with Mo was detected.

Afterwards, the treated or clean solution was loaded into the Mo precipitation reactor, wherein it was heated to 60° C. Under this condition, sulfuric acid was added, adjusting the solution pH to 3.3.

In these conditions, a precipitation of Mo of 70% was obtained. The solid was filtered and washed with water in a ratio of 3 parts of water to 1 part of solid by weight. From this procedure, a solid with the concentrations described in Table 5 was obtained.

TABLE 5

Ammonium molybdate concentrations.

| Mo | Sb | Bi | As |
|---|---|---|---|
| 57.4% | 0.07% | 0.02% | 4.1% |

This solid was further calcined in an electric oven for 3.5 h, reaching a temperature of 650° C. The results of the concentration for the product are shown in Table 6.

TABLE 6

| Concentrations of elements in the produced molybdenum trioxide. | | | | | | | | | |
|---|---|---|---|---|---|---|---|---|---|
| Mo | As | Sb | Bi | K | Fe | Ca | Al | Cu | Mg |
| 64% | 0.085% | 0.027% | 0.016% | 0.026% | 0.018% | 0.002% | 0.002% | 0.010% | 0.022% |

Using the present invention, the final molybdenum product exceeds the conventional commercial standards of concentration. The obtained purity is compatible with the conventional market of technical grade molybdenum trioxide.

We claim:

1. A process for recovery of technical grade molybdenum from diluted leaching acid solutions (PLS) containing highly concentrated arsenic, from metallurgical residues, wherein the process comprises the steps of:
   (a) contacting a pre-filtered acid leaching solution (PLS), from leaching of casting powders, with an anionic ion exchange resin to produce a charged ion exchange resin;
   (b) washing the charged ion exchange resin of step (a) with water;
   (c) extracting molybdenum from the washed ion exchange resin using an alkaline regenerating ammonium solution having a pH value between 8 and 12, to form ammonium molybdate in solution, which is recycled for adjusting molybdenum concentration;
   (d) washing the resin of step (c) with water;
   (e) adding magnesium and/or iron salts to the ammonium molybdate solution recovered in step (c) to form a precipitate of $Mg_3(AsO_4)_2$ and/or $FeAsO_4$ which is carried to an arsenic abatement step, and a solution containing ammonium molybdate in solution;
   (f) adding sulfuric acid to the ammonium molybdate solution obtained in step (e) for precipitating molybdenum in the form of ammonium molybdate $((NH_4)_4Mo_8O_{26})$ in an acid medium having a pH value between 1.5 and 4;
   (g) separating the precipitate formed in step (f) by filtrating ammonium molybdate and recycling the obtained solution to the PLS solution of step (a);
   (h) calcining the precipitate separated in step (g) to obtain molybdenum trioxide ($MoO_3$), and ammonia; and
   (i) recovering ammonia produced in step (h) for returning to the process as recycled regenerating solution.

2. A process for recovery of technical grade molybdenum according to claim 1, wherein the ion exchange resin of step (a) is a resin comprising a base having functional groups selected from the group consisting of tertiary amines and polyamines.

3. A process for recovery of technical grade molybdenum according to claim 1, wherein in step (e) magnesium sulfate is the magnesium salt.

4. A process for recovery of technical grade molybdenum according to claim 1, wherein the regenerating ammonium solution in step (c) has a pH value between 8.5 and 9.5.

5. A process for recovery of technical grade molybdenum according to claim 1, wherein in step (h) calcination is performed at temperatures between 20 and 700° C.

6. A process for recovery of technical grade molybdenum according to claim 1, wherein recovery of ammonia produced in step (h) is performed in a condenser.

7. A process for recovery of technical grade molybdenum according to claim 1, wherein recovery of ammonia produced in step (h) is performed in a gas scrubber.

* * * * *